US011959774B1

United States Patent
Zhao et al.

(10) Patent No.: US 11,959,774 B1
(45) Date of Patent: Apr. 16, 2024

(54) EXTRINSIC CALIBRATION OF SENSORS MOUNTED ON A VEHICLE

(71) Applicant: Waymo LLC, Mountain View, CA (US)

(72) Inventors: Sheng Zhao, Mountain View, CA (US); Damien Dusha, Mountain View, CA (US); Craig Robinson, Santa Clara, CA (US); Volker Grabe, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 683 days.

(21) Appl. No.: 16/950,687

(22) Filed: Nov. 17, 2020

(51) Int. Cl.
| | |
|---|---|
| *G01C 25/00* | (2006.01) |
| *G01C 21/16* | (2006.01) |
| *G01S 7/40* | (2006.01) |
| *G01S 7/497* | (2006.01) |
| *G06T 7/80* | (2017.01) |
| *G01S 13/931* | (2020.01) |
| *G01S 17/931* | (2020.01) |

(52) U.S. Cl.
CPC ....... *G01C 25/005* (2013.01); *G01C 21/1652* (2020.08); *G01C 21/1656* (2020.08); *G01S 7/40* (2013.01); *G01S 7/4972* (2013.01); *G06T 7/80* (2017.01); *G01S 13/931* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 8,781,737 B2 | 7/2014 | Czompo | |
| 10,241,215 B2 | 3/2019 | Medagoda et al. | |
| 2015/0153376 A1* | 6/2015 | Preston | B60W 40/114 702/141 |
| 2020/0088858 A1 | 3/2020 | Li et al. | |

FOREIGN PATENT DOCUMENTS

CN 110703229 A 1/2020

OTHER PUBLICATIONS

Hillemann et al., Impact of Different Trajectories on Extrinsic Self-Calibration for Vehicle-Based Mobile Laser Scanning Systems, "The International Archives of the Photogrammetry, Remote Sensing and Spatial Information Sciences," Sep. 2019, pp. 119-125, vol. XLII-2/W16, ISPRS, Germany.

* cited by examiner

*Primary Examiner* — Adam D Tissot
(74) *Attorney, Agent, or Firm* — McDonnell Boehnen Hulbert & Berghoff LLP (57) ABSTRACT

Systems and methods for extrinsic calibration of vehicle-mounted sensors are provided. One example method involves obtaining first sensor data collected by a first sensor and a second sensor while a vehicle is aligned in a first yaw direction. The method also involves obtaining second sensor data collected by the first sensor and the second sensor while the vehicle is aligned in a second yaw direction. The method also involves determining, based on the first sensor data and the second sensor data, (i) first pitch and roll misalignments of the first sensor relative to the vehicle and (ii) second pitch and roll misalignments of the second sensor relative to the first sensor. The method also involves determining third pitch and roll misalignments of the second sensor relative to the vehicle based on (i) the first pitch and roll misalignments and (ii) the second pitch and roll misalignments.

20 Claims, 7 Drawing Sheets

EXTRINSIC CALIBRATION OF SENSORS MOUNTED ON A VEHICLE

BACKGROUND

A vehicle may be equipped with a variety of sensors to facilitate safe operation of the vehicle in a surrounding environment. Example sensors may include position sensors (e.g., Global Positioning System, etc.), inertial sensors (e.g., gyroscopes, accelerometers, etc.), scanning sensors (e.g., LIDARs, RADARs, Cameras, etc.), among other types of sensors.

SUMMARY

In a first example, a method is provided that involves obtaining first sensor data from a first sensor of a vehicle and a second sensor of the vehicle. The first sensor data is collected while the vehicle is aligned in a first yaw direction. The first sensor is configured to provide measurements related to a pose of the first sensor. The second sensor is configured to scan an environment of the vehicle. The method also involves obtaining second sensor data from the first sensor and the second sensor. The second sensor data is collected while the vehicle is aligned in a second yaw direction. The method also involves determining, based on the first sensor data and the second sensor data, (i) first pitch and roll misalignments of the first sensor relative to the vehicle and (ii) second pitch and roll misalignments of the second sensor relative to the vehicle. The method also involves determining third pitch and roll misalignments of the second sensor relative to the vehicle based on (i) the first pitch and roll misalignments and (ii) the second pitch and roll misalignments.

In a second example, a vehicle is provided that includes an inertial measurement unit (IMU), a light detection and ranging device (LIDAR), one or more processors, and data storage. The data storage stores instructions that, when executed by the one or more processors, cause the vehicle to perform operations. The operations comprise obtaining first sensor data collected, by the IMU and the LIDAR, while the vehicle is aligned in a first yaw direction. The operations also comprise obtaining second sensor data collected, by the IMU and the LIDAR, while the vehicle is aligned in a second yaw direction. The operations also comprise determining, based on the first sensor data and the second sensor data, (i) first pitch and roll misalignments of the IMU relative to the vehicle and (iii) second pitch and roll misalignments of the LIDAR relative to the IMU. The operations also comprise determining third pitch and roll misalignments of the LIDAR relative to the vehicle based on (i) the first pitch and roll misalignments and (ii) the second pitch and roll misalignments.

In a third example, a method is provided that involves obtaining first sensor data from an inertial measurement unit (IMU) mounted on a vehicle and a LIDAR mounted on the vehicle. The first sensor data is collected while the vehicle is aligned in a first yaw direction. The method also involves obtaining second sensor data from the IMU and the LIDAR. The second sensor data is collected while the vehicle is aligned in a second yaw direction. The method also involves determining, based on the first sensor data and the second sensor data, (i) first pitch and roll misalignments of the IMU relative to the vehicle and (ii) second pitch and roll misalignments of the LIDAR relative to the IMU. The method also involves determining third pitch and roll misalignments of the LIDAR relative to the vehicle based on (i) the first pitch and roll misalignments and (ii) the second pitch and roll misalignments.

In a fourth example, a system is provided that includes means for obtaining first sensor data from a first sensor of a vehicle and a second sensor of the vehicle. The first sensor data is collected while the vehicle is aligned in a first yaw direction. The first sensor is configured to provide measurements related to a pose of the first sensor. The second sensor is configured to scan an environment of the vehicle. The system also includes means for obtaining second sensor data from the first sensor and the second sensor. The second sensor data is collected while the vehicle is aligned in a second yaw direction. The system also includes means for determining, based on the first sensor data and the second sensor data, (i) first pitch and roll misalignments of the first sensor relative to the vehicle and (ii) second pitch and roll misalignments of the second sensor relative to the vehicle. The system also includes means for determining third pitch and roll misalignments of the second sensor relative to the vehicle based on (i) the first pitch and roll misalignments and (ii) the second pitch and roll misalignments.

In a fifth example, a system is provided that includes means for obtaining first sensor data from an inertial measurement unit (IMU) mounted on a vehicle and a LIDAR mounted on the vehicle. The first sensor data is collected while the vehicle is aligned in a first yaw direction. The system also includes means for obtaining second sensor data from the IMU and the LIDAR. The second sensor data is collected while the vehicle is aligned in a second yaw direction. The system also includes means for determining, based on the first sensor data and the second sensor data, (i) first pitch and roll misalignments of the IMU relative to the vehicle and (ii) second pitch and roll misalignments of the LIDAR relative to the IMU. The system also includes means for determining third pitch and roll misalignments of the LIDAR relative to the vehicle based on (i) the first pitch and roll misalignments and (ii) the second pitch and roll misalignments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example"

and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A vehicle may include a variety of sensors mounted at different locations on and/or inside the vehicle. Each sensor may provide an output that varies depending on the mounting position and/or pose of the sensor installed on the vehicle. For example, a measurement of a position or heading of the vehicle may be based on an expected relative alignment and/or position of a sensor (e.g., IMU) relative to a frame of reference of the vehicle. As another example, LIDAR point cloud data could be mapped according to expected directions of the LIDAR signals transmitted into the scanned environment relative to the vehicle. Accordingly, example extrinsic calibration processes are provided herein to account for the various mounting offsets and/or misalignments of the sensors.

Some examples herein may also involve selecting a sufficient amount of sensor data to achieve extrinsic calibration of multiple sensors efficiently and accurately. For example, an IMU and a LIDAR can be calibrated simultaneously using data collected by both sensors during two or three particular vehicle positions. To facilitate this, in some examples, a minimal solver framework is provided for selecting a sufficient amount of sensor data for reliably computing specific calibration parameters (e.g., roll, pitch, and/or yaw offsets). In this way, for instance, the time and physical space needed to maneuver a vehicle during the calibration procedure can be reduced while maintaining the reliability of the calibration parameter computations. Additionally, for instance, IMU bias errors (e.g., due to ground surface unevenness, etc.) in LIDAR calibration parameter computations can be reduced by calibrating both sensors simultaneously. Other advantages and examples are possible as well.

II. EXAMPLE VEHICLE SYSTEMS

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. Further, in some embodiments, example systems might not include a vehicle.

Figure 1:
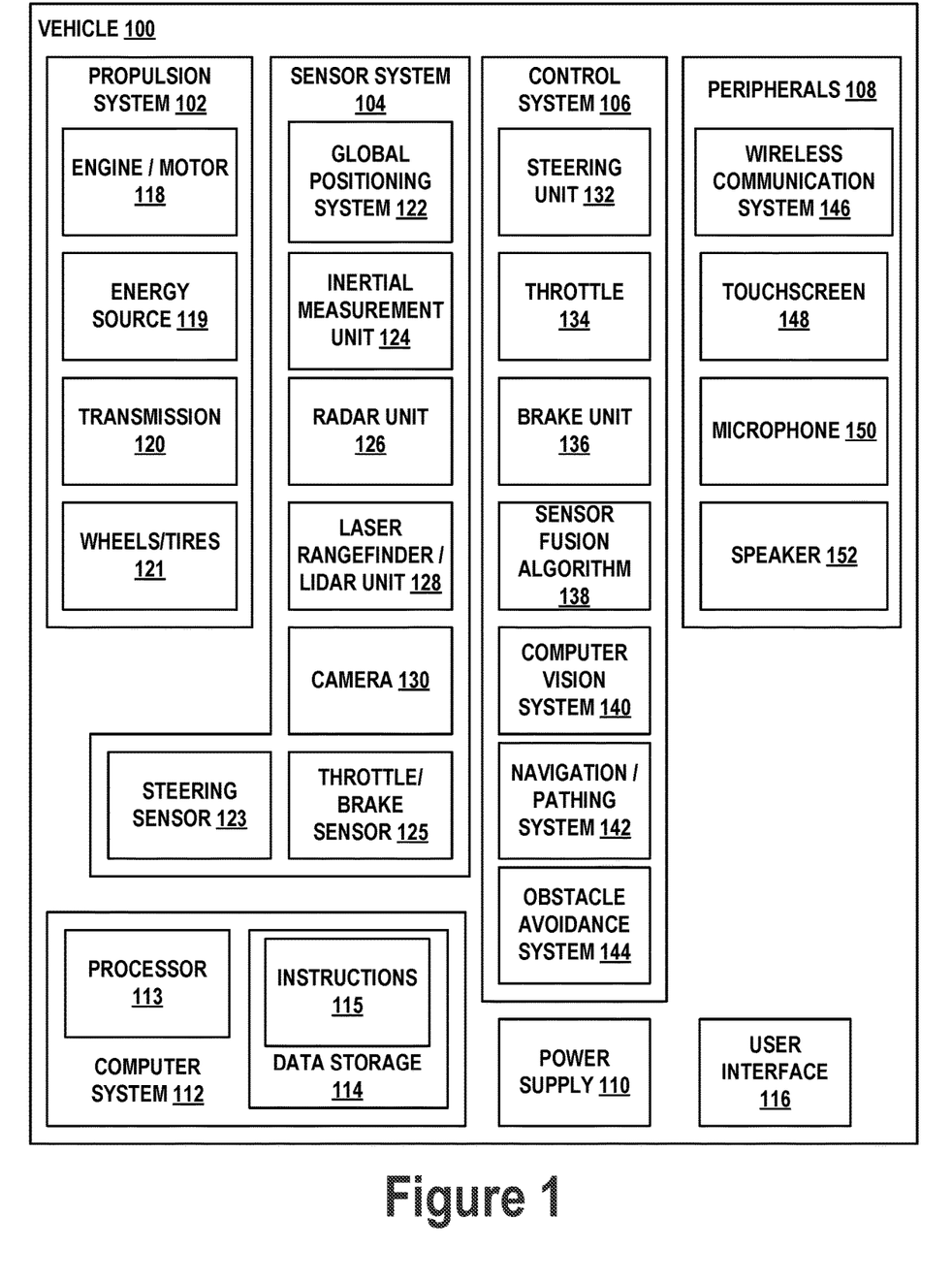
FIG. 1 illustrates a block diagram of a vehicle, in accordance with example embodiments.

Referring now to the figures, FIG. 1 is a functional block diagram illustrating example vehicle 100, which may be configured to operate fully or partially in an autonomous mode. In some examples, vehicle 100 may operate in an autonomous mode by receiving and/or generating control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/ brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch, roll, and/or yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). In some examples, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIGBEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder/LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object.

The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
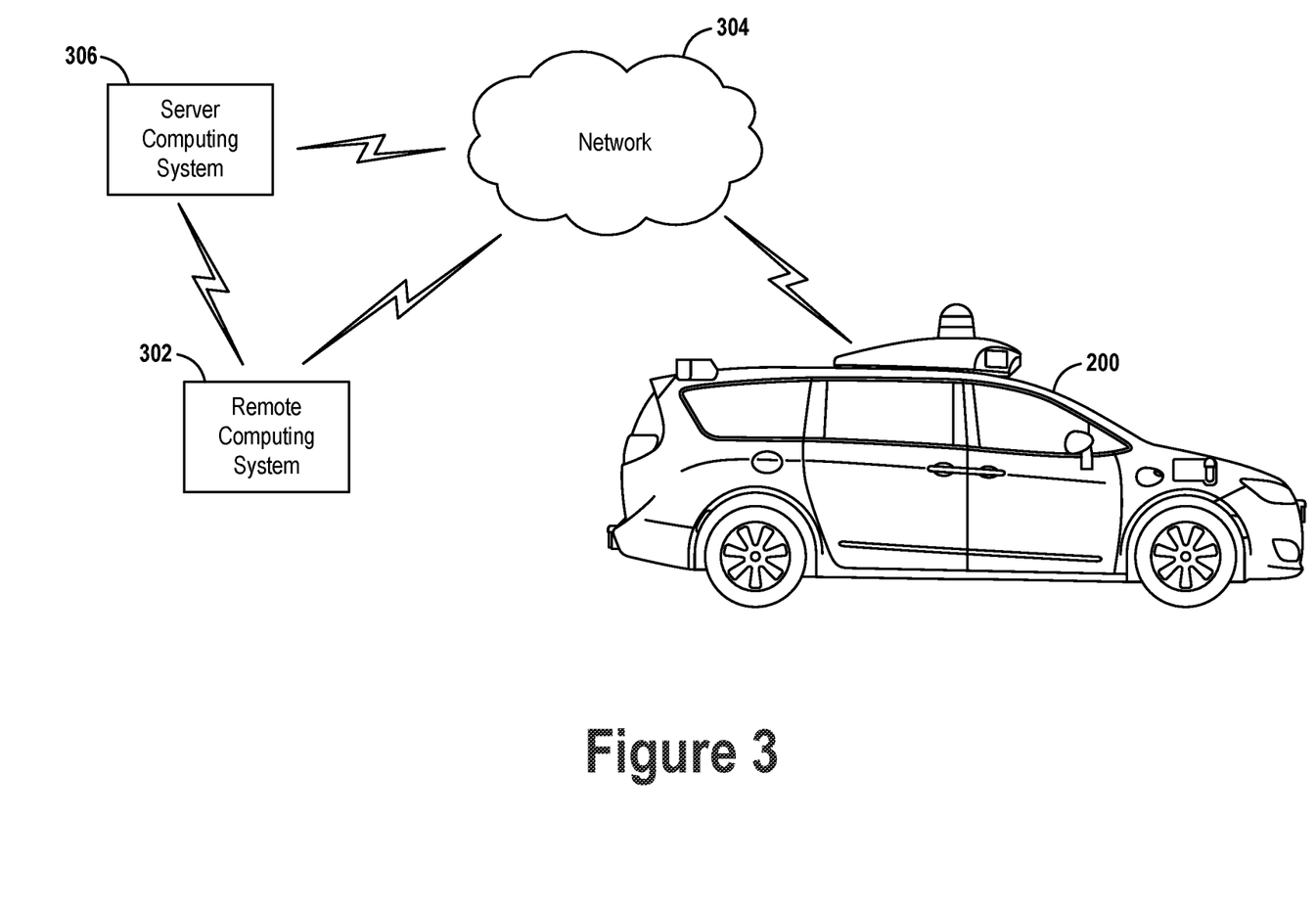
FIG. 3 is a conceptual illustration of wireless communication between various computing systems and a vehicle, in accordance with example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. In some examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. In one example, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In yet another example, remote computing system 302 may be a computing device with a touchscreen operable by the passenger of vehicle 200.

In some embodiments, one or more operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

Figure 2A:
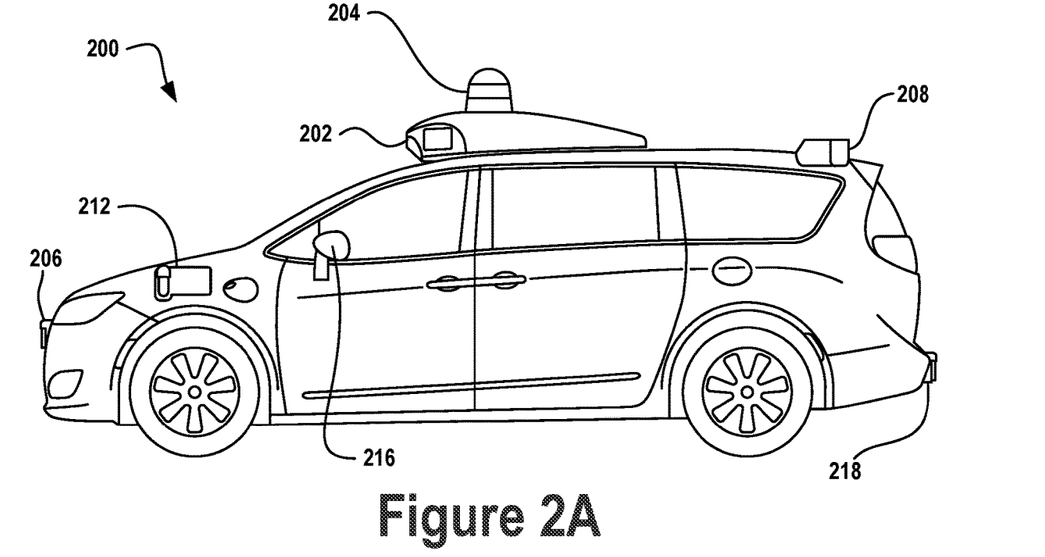
FIGS. 2A, 2B, 2C, 2D, and 2E illustrate a physical configuration of a vehicle, in accordance with example embodiments.
Figure 2B:
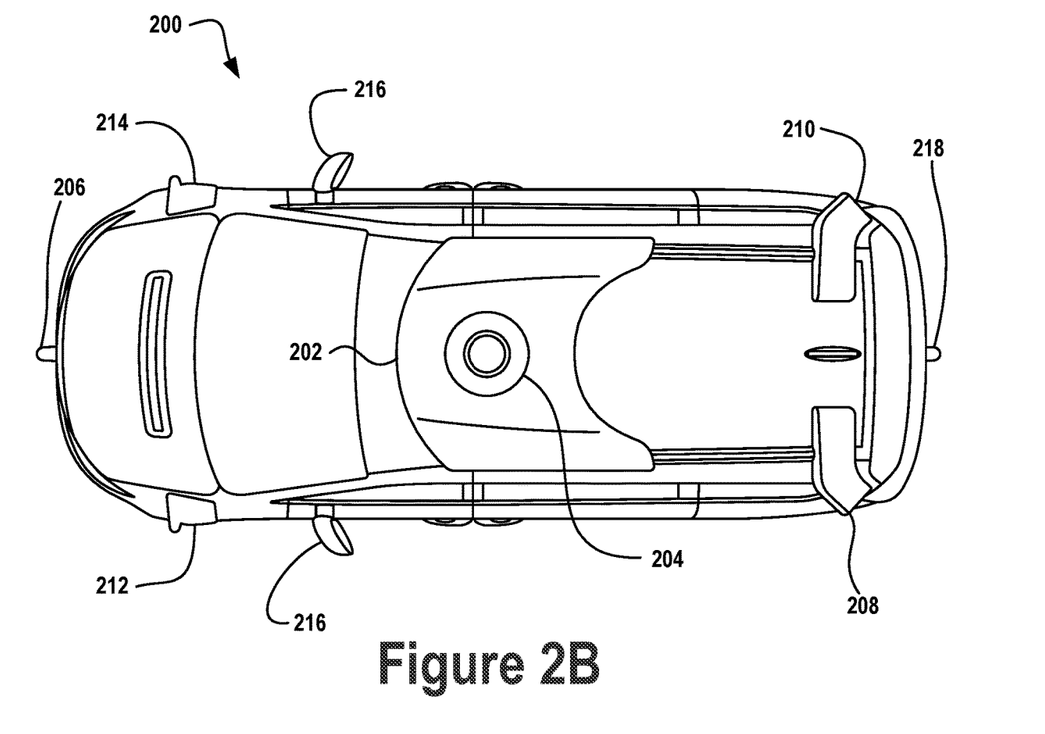
Figure 2C:
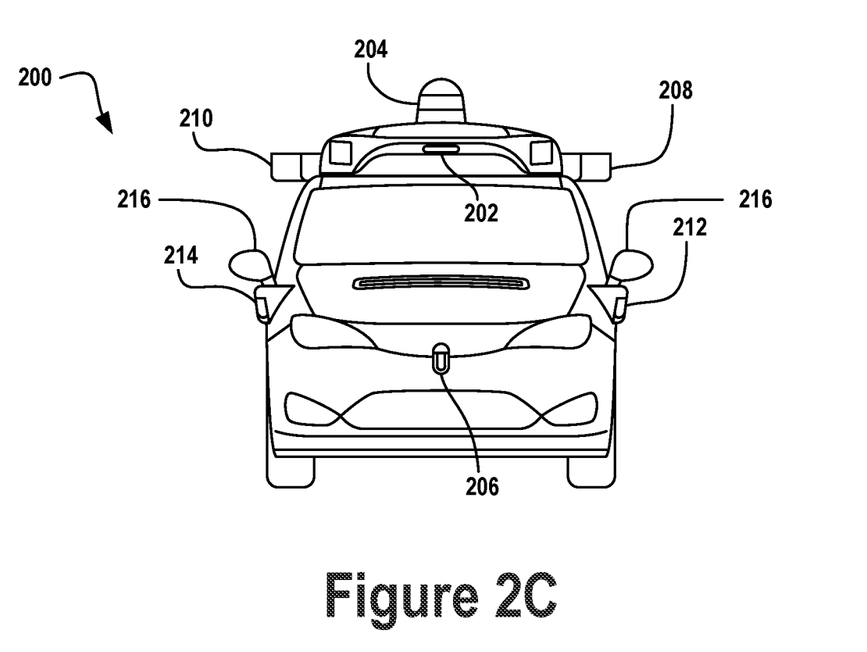
Figure 2D:
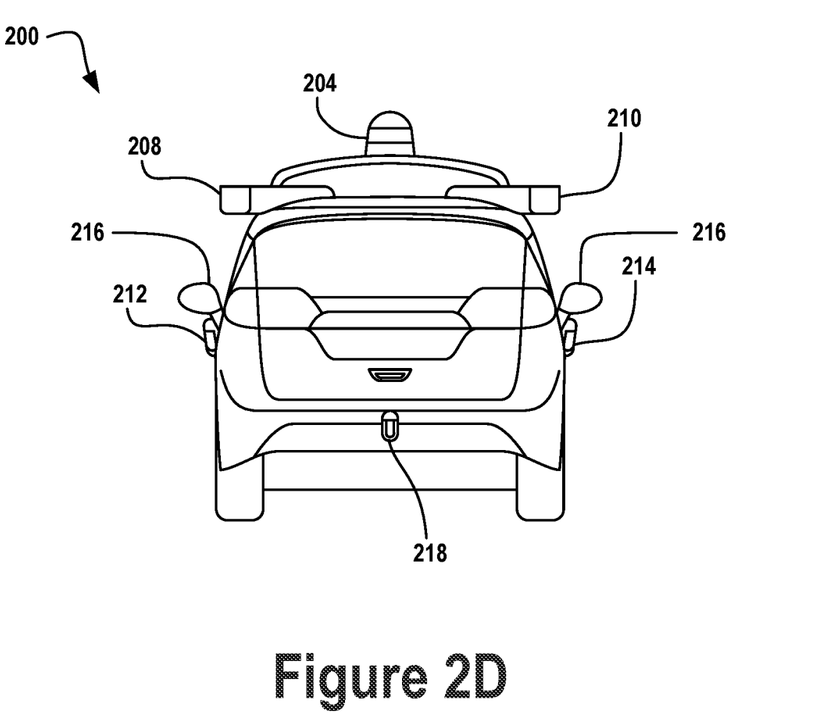
Figure 2E:
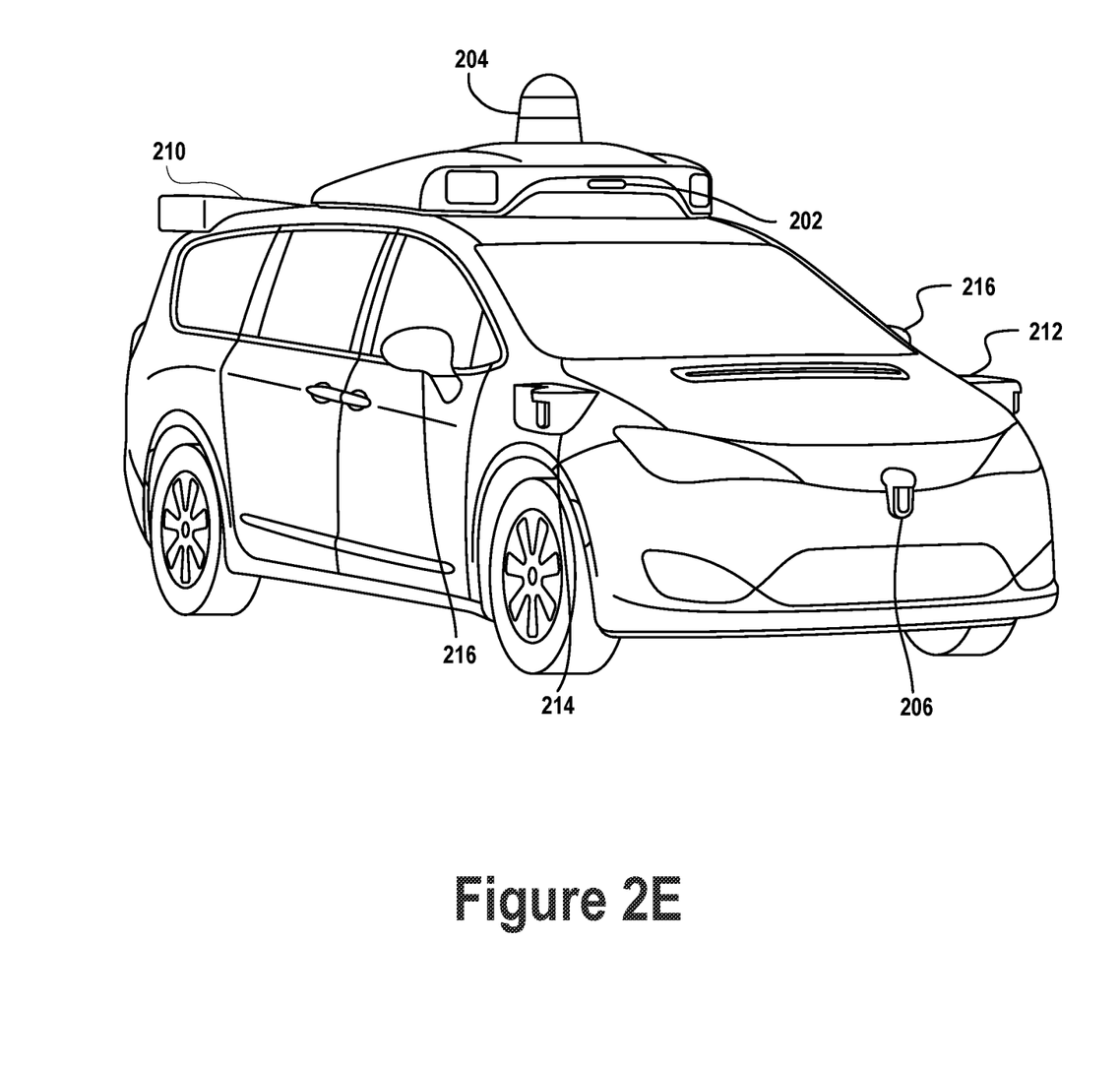

In some embodiments, to facilitate autonomous operation, a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

III. EXAMPLE VEHICLE SENSOR EXTRINSIC CALIBRATION OPERATIONS

Figure 4:
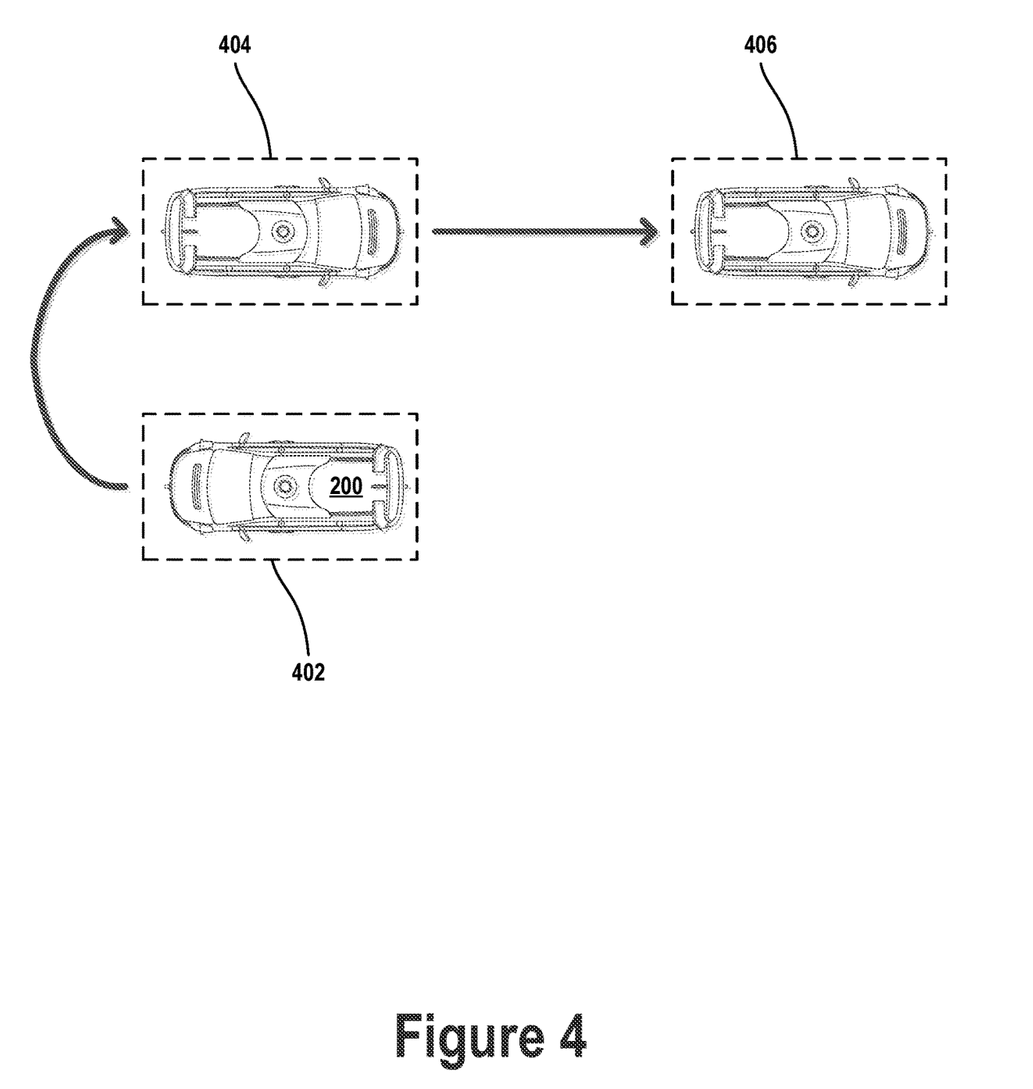
FIG. 4 is a conceptual illustration of an extrinsic calibration process, in accordance with example embodiments.

FIG. 4 is a conceptual illustration of an extrinsic calibration process, in accordance with example embodiments. In the scenario of FIG. 4, vehicle 200 is configured to move from a first position 402 to a second position 404 and then to a third position 406.

At position 402, two or more sensors of vehicle 200 are configured to collect first sensor data. By way of example, a first sensor of vehicle 200 may be an IMU (e.g., similar to IMU 124 of vehicle 100) configured to perform inertial measurements indicative of a pose of the sensor (e.g., roll, pitch, yaw) relative to a first sensor frame (e.g., roll axis, pitch axis, yaw axis) of the first sensor. For example, a roll angle measurement by the first sensor may correspond to an angle from a roll axis of the first sensor. In this example, the first sensor may also be configured to provide a gravity vector measurement (e.g., a measurement of the direction of gravity with respect to the first sensor frame of the first sensor).

Continuing with the example above, a second sensor of vehicle 200 may be a LIDAR sensor (e.g., similar to any of LIDARs 128, 204, 206, etc.). Thus, the second sensor may be configured to scan an environment of vehicle 200, at position 402, and provide an output indicative of the scan (e.g., LIDAR point cloud) relative to a second sensor frame (e.g., roll axis, pitch axis, yaw axis) of the second sensor. For example, each point in the LIDAR point cloud could be mapped to a location from which an emitted light pulse from the LIDAR was reflected back to the LIDAR. The mapping of the location may be based on the yaw, pitch, and/or roll direction of the light pulse with respect to the second sensor frame of the second sensor.

Continuing with the example above, the vehicle then moves from position 402 to position 404. For instance, the vehicle may perform a U-turn maneuver (e.g., 180 degree rotation about a yaw axis of the vehicle) to navigate from position 402 to position 404. Other vehicle rotation angles are possible as well. The first sensor and the second sensor are then configured to collect second sensor data while the vehicle is at position 404.

In some implementations, a system of the present disclosure (e.g., computer system 112, server computing system 306, remote computing system 302, etc.) may then be configured to determine roll and pitch extrinsic calibration parameters for the first sensor and the second sensor using the first sensor data and the second sensor data collected while the vehicle was at the two poses 402 and 404. Equation [1] is a mathematical representation of the system described in the scenario above.

$$g^{s1} = R_l^s R_{l_2}^{l_1} R_s^l g^{s2} \quad [1]$$

In equation [1], $g^{s1}$ is a gravity vector measurement (e.g., indicated by the IMU) while the vehicle is at the first position 402, and $g^{s2}$ is a second gravity vector measurement (e.g., indicated by the IMU) while the vehicle is at the second position 404.

Additionally, $R_{l_2}^{l_1}$ is a rotation matrix that represents rotational offsets between a first scan of the environment performed by the LIDAR (i.e., second sensor) while the vehicle is at position 402 and a second scan of the environment performed by the LIDAR while the vehicle is at position 404. The values in the $R_{l_2}^{l_1}$ matrix can be computed, for instance, by comparing the LIDAR point cloud data using an iterative closest point (ICP) algorithm or other comparison process.

Finally, $R_l^s$ is a rotation matrix that represents the relative rotation of the first sensor ('s') relative to the second sensor ('l'). $R_s^l$ is a rotation matrix that represent the relative rotation of the second sensor ('l') relative to the second sensor. Thus, in some implementations, a system of the present disclosure may be configured to determine pitch and roll misalignments of the first sensor ('s') relative to the second sensor ('l') by solving equation [1] to compute $R_l^s$ and/or $R_s^l$. For example, the system may solve equation [1] to determine the pitch and roll components of $R_l$ using a least square problem formulation as shown in equation [2] below.

$$\min_{R_l^s} \|g^{s1} - R_l^s R_{l_2}^{l_1} R_s^l g^{s2}\|^2 \quad [2]$$

Equation [2] can then be solved in an iterative manner (e.g., by computing the jacobian and residual, etc.). In one example, the least square problem can be solved using QR decomposition or any other technique for estimating the pitch and roll components of $R_l^s$.

Similarly, a system of the present disclosure may compute pitch and roll misalignments between the first sensor and the vehicle, as shown in equation [3] below.

$$g^{s1} = R_v^s R_{v_2}^{v_1} R_s^v g^{s2} \quad [3]$$

In equation [3], $g^{s1}$ and $g^{s2}$ are the same gravity vector measurements described in equation [1]. $R_{v_2}^{v_1}$ is the rotational matrix that represents the rotation of the vehicle between position 402 and 404 (e.g., yaw rotation of 180 degrees, etc.). $R_v^s$ is the rotational matrix representing rotational offsets between the first sensor (e.g., IMU) and the vehicle, which can be solved using a least square problem formulation similar to equation [2] to perform pitch and roll extrinsic calibration of an IMU (e.g., first sensor) sensor frame to the vehicle reference frame.

Thus, in some implementations, the pitch and roll misalignments of both sensors can be computed using sensor data collected during two vehicle poses 402 and 404 in line with the discussion above. In this way, for instance, pitch and roll extrinsic calibration of both sensors (e.g., IMU and LIDAR, etc.) relative to the vehicle reference frame can be performed simultaneously using the sensor data collected during the two vehicle poses 402 and 404.

Continuing with the scenario of FIG. 4, vehicle 200 may then be configured to move from position 404 to position 406 by navigating in the yaw direction for at least a given distance (e.g., 30 meters). The vehicle may then collect third sensor data at position 406. The third sensor data may include a scan of the environment by the second sensor (e.g., LIDAR).

Equation [4] below represents the translation portion of the relationship between the sensor frames of the first sensor and the second sensor in this scenario.

$$t_{l_1}^{l_2} = R_s^l (R_{s_2}^{s_1} t_l^s + t_{s_2}^{s_1} - t_l^s) \quad [4]$$

In equation [4], $t_{l_1}^{l_2}$ represents the translation displacement of the second sensor (e.g., LIDAR) between vehicle position 404 and 406 (e.g., 30 meters). $R_s^l$ and $R_{s_2}^{s_1}$ are the same rotational matrixes described for equation [1]. $t_{l_s}$ represents the translational offset between the first sensor ('s') and the second sensor ('l'), which corresponds to the translational offset between the mounting positions of the two sensors on the vehicle. $t_{s_2}^{s_1}$ represents the translational offset between the positions of the first sensor when vehicle 200 moves from position 404 and 406 (e.g., 30 meters, etc.).

In some implementations, a system of the present disclosure may then solve a least square formulation of equation [4] (e.g., similar to equation [2]) to determine a minimum value for the yaw component of $R_s^l$, which corresponds to the yaw misalignment between the first sensor (e.g., IMU) and the second sensor (e.g., LIDAR). Thus, in some examples, the roll and pitch components of $R_s^l$ may be resolved based on equation [1] and the yaw component of $R_s^l$ may be resolved based on equation [4]. Further, in line with the discussion above for equations [1]-[3], the yaw misalignment of the first sensor frame relative to the vehicle frame and the yaw misalignment of the second sensor relative to the vehicle frame can be similarly determined by modifying equation [4].

Thus, some examples herein involve determining pitch and roll components of sensor extrinsic calibration parameters (e.g., using equation [1]) separately from the yaw component (e.g., using equation [4]). In some scenarios, such two-step approach may facilitate mitigating calibration errors associated with the accuracy of pose measurements by the first sensor (e.g., IMU yaw pose measurement errors, IMU translation due to drift, etc.)

In alternative examples however, determining pitch, roll, and yaw components of sensor extrinsic calibration parameters may be determined simultaneously using only two vehicle poses. For instance, equations [1] and [4] can be alternatively solved using sensor data from the same two vehicle poses 402 and 404, instead of solving equation [4] separately using vehicle poses 404 and 406. Other examples are possible.

IV. EXAMPLE METHODS

Figure 5:
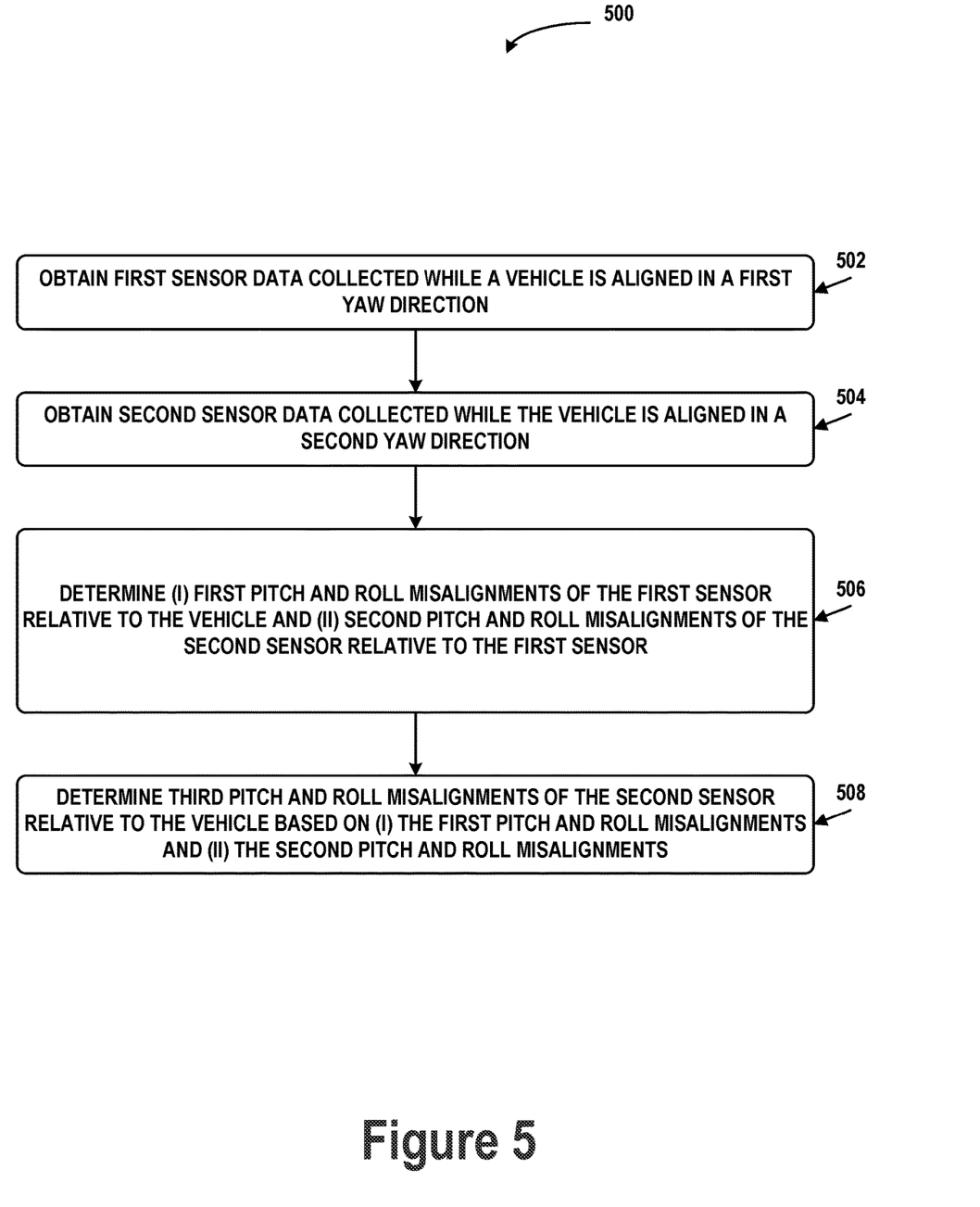
FIG. 5 is a flow chart of a method, in accordance with example embodiments.

FIG. 5 is a flowchart of a method 500, according to example embodiments. Method 500 presents an embodiment of a method that could be used with any of vehicle 100, vehicle 200, system 302, and/or system 306, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 500 and other processes and methods disclosed herein, each block in FIG. 5 may represent circuitry that is wired to perform the specific logical functions in the process.

At block 502, method 500 involves obtaining first sensor data collected while a vehicle is aligned in a first yaw direction.

At block 504, method 500 involves obtaining second sensor data collected while the vehicle is aligned in a second yaw direction.

In some examples, the first sensor data and the second sensor data may be collected using a first sensor and a second sensor mounted to the vehicle.

The first sensor may be configured to provide measurements related to a pose of the first sensor. For example, the first sensor may correspond to an IMU (e.g., IMU 124) that includes one or more inertial sensors (e.g., gyroscopes, accelerometers, etc.) configured to measure the motion, orientation, and/or other inertial information (e.g., aligned with gravity) related to the first sensor with respect to a first sensor frame (e.g., roll axis, pitch axis, yaw axis, etc.) of the first sensor.

The second sensor may be configured to scan an environment of the vehicle. For example, the second sensor may be a LIDAR sensor (e.g., LIDAR 128), a camera (e.g., camera 130), a RADAR (e.g., RADAR 126), or any other scanning sensor. To that end, the second sensor may be configured to provide output indicative of the scan of the environment (e.g., LIDAR point cloud data, etc.).

In some examples, method 500 may involve aligning the vehicle in the first yaw direction and/or aligning the vehicle in the second yaw direction.

In a first example, referring back to FIG. 3, remote computing system 302 and/or server computing system 306 may provide instructions to an operator of vehicle 200 for moving the vehicle to position 402 (shown in FIG. 4) and/or position 404 (shown in FIG. 4).

In a second example, referring back to FIG. 1, control system 106 may operate the vehicle (e.g., in an autonomous driving mode) to navigate the vehicle to positions 402 and/or 404.

In some examples, method 500 may involve selecting the first sensor data and the second sensor data from previously collected sensor data. For example, referring back to FIG. 4, vehicle 200 may be navigating an environment while collecting measurements from the first sensor and the second sensor. A system of method 500 may then select portions of the sensor data collected while the vehicle is navigating the environment, where the selected portions correspond to data collected while the vehicle is in position 402 and/or 404. Other examples are possible.

In some examples, the first sensor data is collected while the vehicle is at a given location in the environment and the second sensor data is collected while the vehicle is also at the given location. Alternatively to the scenario shown in FIG. 4 for example, vehicle 200 may be configured to collect the second sensor data by aligning in an opposite yaw direction at the same position 402 in which the first sensor data was collected. For instance, position 402 may correspond to a parking spot. In this instance, the first sensor data can be collected while the vehicle is aligned in the first yaw direction (e.g., front side of the vehicle facing the left side of the page) and while parked in the parking spot. Further, in this instance, the second sensor data can be collected while the vehicle is aligned in the second yaw direction (e.g., front side of the vehicle facing the right side of the page) and while parked in the same parking spot.

In some examples, the first yaw direction at block 502 is opposite to the second yaw direction at block 504, similarly to vehicle positions 402 and 404 shown in FIG. 4. In alternative examples, the first yaw direction and the second yaw direction may be offset by a different yaw angle. Referring back to FIG. 4 for instance, vehicle 200 may perform a right turn or a turn maneuver instead of the U-turn maneuver described in the scenario of FIG. 4.

At block 506, method 500 involves determining (i) first pitch and roll misalignments of the first sensor relative to the vehicle and (ii) second pitch and roll misalignments of the second sensor relative to the first sensor. The determination at block 506 may be based on the first sensor data and the second sensor data, in line with the discussion of equations [1]-[3] in the description of FIG. 4.

In some examples, method 500 may involve determining a first measurement of gravity ($g^{s1}$) while the vehicle is aligned in the first yaw direction and a second measurement of gravity ($g^{s2}$) while the vehicle is aligned in the second yaw direction, in line with the discussion of equation [1] in the description of FIG. 4.

In some examples, the second sensor may be a LIDAR sensor and method 500 may involve comparing first point cloud data indicated by the LIDAR sensor in the first sensor data with second point cloud data indicated by the LIDAR sensor in the second sensor data (e.g., an ICP technique, etc.), in line with the discussion of equation [1] in the description of FIG. 4.

At block 508, method 500 involves determining third pitch and roll misalignments of the second sensor relative to the vehicle based on (i) the first pitch and roll misalignments and (ii) the second pitch and roll misalignments. For example, the third pitch and roll misalignments (i.e., offsets between a sensor frame of reference of the second sensor and a vehicle frame of reference of the vehicle) can be assembled by adding the first pitch and roll misalignments to the second pitch and roll misalignments, in line with the discussion in the description of FIG. 4.

In some examples, method 500 may involve obtaining third sensor data collected while the vehicle is aligned in the second yaw direction. In these examples, the second sensor data may be collected while the vehicle is at a first location in the environment, and the third sensor data may be collected while the vehicle is at a second location that is at least a given distance from the first location. Referring back to FIG. 4 for instance, the first location may correspond to vehicle position 404 and the second location may correspond to vehicle location 406. Additionally, in these examples, method 500 may involve determining a yaw misalignment of the second sensor based on the second sensor data and the third sensor data, in line with the discussion of equation [4] in the description of FIG. 4.

In some examples, the given distance between the first location and the second location is at least 30 meters. For instance, the 30 meter (or greater) separation may increase the observability of the yaw component of the rotation matrix in the least square formulation described in connection with equation [4] in the description of FIG. 4. However, in other examples, other distances between the first location and the second location are possible as well.

In some examples, method 500 may involve operating the vehicle based on the first pitch and roll misalignments, the second pitch and roll misalignments, and/or the third pitch and roll misalignments. Referring back to FIG. 1 for example, vehicle 100 may update calibration parameters for the first sensor (e.g., IMU 124, etc.) and the second sensor (e.g., LIDAR 128, etc.) to facilitate improving the accuracy and/or robustness of other vehicle systems that rely on output from these sensors (e.g., sensor fusion algorithm 138, navigation system 142, etc.). Other examples are possible.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method comprising:
    obtaining, from a first sensor of a vehicle and a second sensor of the vehicle, first sensor data collected while the vehicle is aligned in a first yaw direction, wherein the first sensor is configured to provide measurements related to a pose of the first sensor, wherein the second sensor is configured to scan an environment of the vehicle, and wherein the first sensor data comprises a first scan of the environment performed by the second sensor;
    obtaining, from the first sensor and the second sensor, second sensor data collected while the vehicle is aligned in a second yaw direction, wherein the second sensor data comprises a second scan of the environment performed by the second sensor;
    determining first pitch and roll misalignments of the first sensor relative to the vehicle based on the first sensor data and the second sensor data;
    determining second pitch and roll misalignments of the second sensor relative to the first sensor based on the first sensor data and the second sensor data, wherein determining the second pitch and roll misalignments of the second sensor relative to the first sensor comprises determining a matrix that represents rotational offsets between the first scan of the environment performed by the second sensor and the second scan of the environment performed by the second sensor; and
    determining third pitch and roll misalignments of the second sensor relative to the vehicle based on (i) the first pitch and roll misalignments and (ii) the second pitch and roll misalignments.

2. The method of claim 1, wherein the first sensor data is collected while the vehicle is at a given location in the environment, and wherein the second sensor data is collected while the vehicle is at the given location.

3. The method of claim 1, further comprising:
    obtaining, from the second sensor, third sensor data collected while the vehicle is aligned in the second yaw direction, wherein the second sensor data is collected while the vehicle is at a first location in the environment, and wherein the third sensor data is collected while the vehicle is at a second location that is at least a given distance from the first location;
    based on the second sensor data and the third sensor data, determining a yaw misalignment of the second sensor.

4. The method of claim 3, wherein the given distance is at least 30 meters.

5. The method of claim 1, wherein the first yaw direction is opposite to the second yaw direction.

6. The method of claim 1, wherein the second sensor is a light detection and ranging (LIDAR) sensor.

7. A vehicle comprising:
   an inertial measurement unit (IMU);
   a light detection and ranging device (LIDAR), wherein the LIDAR is configured to scan an environment of the vehicle;
   one or more processors; and
   data storage storing instructions that, when executed by the one or more processors, cause the vehicle to perform operations comprising:
   obtaining first sensor data collected, by the IMU and the LIDAR, while the vehicle is aligned in a first yaw direction, wherein the first sensor data comprises a first scan of the environment performed by the LIDAR;
   obtaining second sensor data collected, by the IMU and the LIDAR, while the vehicle is aligned in a second yaw direction, wherein the second sensor data comprises a second scan of the environment performed by the LIDAR;
   determining first pitch and roll misalignments of the IMU relative to the vehicle based on the first sensor data and the second sensor data,
   determining second pitch and roll misalignments of the LIDAR relative to the IMU based on the first sensor data and the second sensor data, wherein determining the second pitch and roll misalignments of the LIDAR relative to the IMU comprises determining a matrix that represents rotational offsets between the first scan of the environment performed by the LIDAR and the second scan of the environment performed by the LIDAR; and
   determining third pitch and roll misalignments of the LIDAR relative to the vehicle based on (i) the first pitch and roll misalignments and (ii) the second pitch and roll misalignments.

8. The vehicle of claim 7, wherein the operations further comprise:
   determining, based on output from the IMU, a first measurement of gravity while the vehicle is aligned in the first yaw direction and a second measurement of gravity while the vehicle is aligned in the second yaw direction,
   wherein determining the first pitch and roll misalignments is further based on the first measurement of gravity and the second measurement of gravity.

9. The vehicle of claim 7, wherein the first sensor data is collected while the vehicle is at a given location in the environment, and wherein the second sensor data is collected while the vehicle is at the given location.

10. The vehicle of claim 7, wherein the operations further comprise:
    obtaining third sensor data collected by the LIDAR while the vehicle is aligned in the second yaw direction, wherein the second sensor data is collected while the vehicle is at a first location in the environment, and wherein the third sensor data is collected while the vehicle is at a second location that is at least a given distance from the first location;
    based on the second sensor data and the third sensor data, determining a yaw misalignment of the LIDAR.

11. The vehicle of claim 10, wherein the given distance is at least 30 meters.

12. The vehicle of claim 7, wherein the first yaw direction is opposite to the second yaw direction.

13. A method comprising:
    obtaining, from an inertial measurement unit (IMU) mounted on a vehicle and a light detection and ranging device (LIDAR) mounted on the vehicle and configured to scan an environment of the vehicle, first sensor data collected while the vehicle is aligned in a first yaw direction, wherein the first sensor data comprises a first scan of the environment performed by the LIDAR;
    obtaining, from the IMU and the LIDAR, second sensor data collected while the vehicle is aligned in a second yaw direction, wherein the second sensor data comprises a second scan of the environment performed by the LIDAR;
    determining first pitch and roll misalignments of the IMU relative to the vehicle based on the first sensor data and the second sensor data;
    determining second pitch and roll misalignments of the LIDAR relative to the IMU based on the first sensor data and the second sensor data, wherein determining the second pitch and roll misalignments of the LIDAR relative to the IMU comprises determining a matrix that represents rotational offsets between the first scan of the environment performed by the LIDAR and the second scan of the environment performed by the LIDAR; and
    determining third pitch and roll misalignments of the LIDAR relative to the vehicle based on (i) the first pitch and roll misalignments and (ii) the second pitch and roll misalignments.

14. The method of claim 13, wherein the first sensor data is collected while the vehicle is at a given location in the environment, and wherein the second sensor data is collected while the vehicle is at the given location.

15. The method of claim 13, further comprising:
    obtaining, from the LIDAR, third sensor data collected while the vehicle is aligned in the second yaw direction, wherein the second sensor data is collected while the vehicle is at a first location in the environment, and wherein the third sensor data is collected while the vehicle is at a second location that is at least a given distance from the first location;
    based on the second sensor data and the third sensor data, determining a yaw misalignment of the LIDAR.

16. The method of claim 15, wherein the given distance is at least 30 meters.

17. The method of claim 13, wherein the first yaw direction is opposite to the second yaw direction.

18. The method of claim 13, further comprising:
    determining, based on output from the IMU, a first measurement of gravity while the vehicle is aligned in the first yaw direction and a second measurement of gravity while the vehicle is aligned in the second yaw direction,
    wherein determining the first pitch and roll misalignments is further based on the first measurement of gravity and the second measurement of gravity.

19. The method of claim 1, wherein the first sensor is an inertial measurement unit (IMU).

20. The method of claim 19, further comprising:
    determining, based on output from the IMU, a first measurement of gravity while the vehicle is aligned in the first yaw direction and a second measurement of gravity while the vehicle is aligned in the second yaw direction, wherein determining the first pitch and roll misalignments is further based on the first measurement of gravity and the second measurement of gravity.

* * * * *